United States Patent [19]

Pucci et al.

[11] Patent Number: 5,070,143

[45] Date of Patent: Dec. 3, 1991

[54] ADHESIVE BLEND OF POLYOLEFINS AND GRAFTED BLOCK COPOLYMER OF POLYSTYRENE

[75] Inventors: Mark S. Pucci, Elk Grove Village; Mitsu Shida, Barrington; John Machonis, Jr., Schaumburg; Kevin Jachec, Highwood, all of Ill.

[73] Assignee: Morton International, Inc., Chicago, Ill.

[21] Appl. No.: 321,485

[22] Filed: Mar. 9, 1989

[51] Int. Cl.$^5$ .................. C08L 23/06; C08L 23/08; C08L 23/12; C08L 53/02

[52] U.S. Cl. .......................... 525/74; 525/78; 525/941; 524/505

[58] Field of Search ................. 525/74, 78

[56] References Cited

U.S. PATENT DOCUMENTS

| | | |
|---|---|---|
| 3,483,276 | 12/1969 | Mahlman . |
| 3,562,356 | 2/1971 | Nyberg et al. ............ 525/93 |
| 3,630,980 | 12/1971 | Russell ................ 525/93 |
| 3,697,465 | 10/1972 | Joyner et al. . |
| 3,746,676 | 7/1973 | Joyner et al. . |
| 3,886,227 | 5/1975 | Van Brederode et al. . |
| 4,058,647 | 11/1977 | Inone et al. . |
| 4,087,587 | 5/1978 | Shida et al. . |
| 4,087,588 | 5/1978 | Shida et al. . |
| 4,198,327 | 4/1980 | Matsumoto et al. . |
| 4,308,353 | 12/1981 | Saito et al. .............. 525/74 |
| 4,423,117 | 12/1983 | Maconis, Jr. et al. . |
| 4,477,532 | 10/1984 | Schmukler et al. . |
| 4,570,286 | 2/1986 | Ross . |
| 4,578,429 | 3/1986 | Gergen et al. . |
| 4,628,072 | 12/1986 | Shiraki et al. ............ 525/98 |
| 4,835,218 | 5/1989 | Yoshimura et al. ........ 525/98 |
| 4,868,245 | 9/1989 | Pattick et al. ............ 525/98 |
| 4,904,728 | 2/1990 | George ................ 525/98 |
| 4,906,687 | 3/1990 | Modic ................. 525/98 |

FOREIGN PATENT DOCUMENTS

| | | |
|---|---|---|
| 60-101130 | 6/1985 | Japan . |
| 1119629 | 7/1968 | United Kingdom . |
| 1335791 | 10/1973 | United Kingdom . |

OTHER PUBLICATIONS

"Plastics Technology", Oct. 1987.
"Modern Plastics International", Sep., 1987.
"Technical Bulletin ShellChemical Compnay", Kraton FG 1901X Rubber brochure #SC:592-87.

*Primary Examiner*—Carman J. Seccuro
*Attorney, Agent, or Firm*—Wayne E. Nacker; Gerald K. White

[57] ABSTRACT

Composition comprising a mixture of from about 30% to about 99.9% of a polyolefin base resin; from about 0.1% to about 50% of a graft polymerized block copolymer having polystyrene end blocks and an aliphatic middle block; from 0 to about 40% by weight of an elastomer different from the above components; and from 0 to about 30% by weight of a nonelastomeric second polyolefin made from different monomers from those of the polyolefin base resin. The composition can be used as an adhesive film or tie layer, optinally by coextrusion between layers to be joined. Coatings and coated substrates are also disclosed.

14 Claims, No Drawings

ADHESIVE BLEND OF POLYOLEFINS AND GRAFTED BLOCK COPOLYMER OF POLYSTYRENE

TECHNICAL FIELD

The present invention relates to a polyolefin-based composition suitable for adhering to polar or nonpolar substrates, or for joining polyolefins to polar or nonpolar polymers. One particular application of the composition is as an extrudible adhesive tie resin to join adjacent, coextruded layers.

BACKGROUND

Composite packaging structures including one or more fluid-impermeable or heat-sealable layers of a polyolefin such as polyethylene or polypropylene and one or more oxygen impermeable or otherwise functioning layers of a polar polymer, such as nylon and others, are well known. One continuing problem is how to join a nonpolar polyolefin and a polar polymer to achieve the highest possible adhesion. Polar and nonpolar materials do not adhere directly, and it is difficult to formulate an adhesive which adheres to both polar and nonpolar materials with optimal adhesive strength.

An early, partial solution to this problem, which is still employed widely, is an adhesive consisting essentially of a polyolefin blended with a graft copolymer of the same polyolefin. The graft monomer is a carboxylic acid or anhydride. The most widely used graft monomers are maleic anhydride and acrylic acid, particularly the former. The first commercially prominent version of this graft copolymer was the HERCOPRIME series of maleic anhydride-modified polypropylenes sold by Hercules Inc. (See U.S. Pat. Nos. 3,483,276 and 4,570,286). Now there are many commercial sources of this and other graft polymerized polyolefins.

Representative patents describing blends of a polyolefin and its graft copolymer are as follows: U.S. Pat. Nos. 3,697,465 (column 3, lines 64-67) and 3,746,676 (column 3, lines 32-37), each issued to Joyner, et al., specifically teach that the maleated copolymer should be based on the same resin as the polyolefin base material. U.S. Pat. Nos. 4,087,587 and 4,423,117 describe a polyethylene base material combined with a graft copolymer of polyethylene. U.S. Pat. No. 4,477,532 (column 1, lines 12-30) and British Patent No. 1,335,791 teach a polypropylene base material combined with grafted polypropylene.

In the next generation of polyolefin adhesives, an elastomer was added to further improve adhesion to polar substrates. Exemplary patents are U.S. Pat. Nos. 4,058,647; 4,198,327; 3,886,227; 4,423,117; and the two Joyner patents previously cited.

A related problem in the art has been how to adhere polyolefin-based coatings to metals, which are also polar substrates. The art has improved the adhesion of polyolefin-based coatings to metals by adding graft copolymers and elastomers to the polyolefin.

A common theme in all this development has been the combination of a graft-polymerized polyolefin with an unmodified polyolefin base material. Identical or similar resins have been used for the base material and grafted resin to ensure that the base material and graft copolymer will be compatible and homogeneous when blended.

The use of a graft-copolymerized elastomer by itself or in combination with the unmodified elastomer as an adhesive is described in U.S. Pat. No. 4,578,429 (three-block copolymer having polystrene end blocks and an ethylene/butadiene copolymer middle block, grafted with maleic anhydride) and British Patent No. 1,119,629.

SUMMARY OF THE INVENTION

The inventors have discovered that the adhesion of a blend of a polyolefin base material and a graft copolymer to polar and nonpolar substrates can be improved by selecting a grafted block copolymer having aromatic end blocks (preferably polystyrene) and an aliphatic middle block as the graft copolymer. Surprisingly, this combination provides better adhesion to a variety of polar substrates than the known combination of a polyolefin base material and its graft copolymer, even if the prior art graft copolymer being compared is elastomeric.

The composition described in the preceding paragraph can be further improved by adding a conventional elastomer to the formulation, and still further improved by adding to the composition a nonelastomeric second polyolefin made from a different monomer than the base polyolefin is made from.

Improved methods of adhering substrates together, improved laminated structures in which polar and nonpolar layers are joined, and a polar or nonpolar substrate coated with the present compositions are also part of the present invention.

DETAILED DESCRIPTION OF THE INVENTION

The compositions described herein are mixtures of from about 30% to about 99.9% of a polyolefin base resin, from about 0.1% to about 50% of a grafted block copolymer having aromatic (preferably polystyrene) end blocks and an aliphatic middle block, from 0% to about 40% by weight of conventional elastomer, and from 0% to about 30% by weight of a nonelastomeric polyolefin different from the base polyolefin. Preferred proportions of the principal ingredients are from about 70% to about 98% by weight of the base resin and from about 2% to about 30% by weight of the graft polymerized block copolymer. For three-component blends the relevant proportions preferred herein are from about 50% to about 93% by weight of the base resin, from about 2% to about 20% by weight of the graft copolymer, and from about 5% to about 30% by weight of the elastomer. For four-component blends the preferred proportions are from about 30% to about 83% by weight of the base resin, from about 2% to about 20% by weight by weight of the graft polymerized block copolymer, from about 5% to about 30% of the conventional elastomer, and from about 10% to about 20% by weight of the nonelastomeric second resin. Each of these materials is described more thoroughly below. Further exemplification of these materials can be found by reference to any of the previously identified patents, which are hereby incorporated herein by reference.

The polyolefin base resins preferred herein can be any of the well known homopolymers or copolymers of alpha-olefins, particularly any of those described in the previously incorporated patents. Preferred examples are polypropylene or polyethylene in any of their known embodiments, some of which are copolymers with minor amounts of other olefins or polar materials such as vinyl acetate, vinyl alcohol, methyl acrylate, methyl methacrylate, ethyl acrylate, ethyl methacrylate, or others. One example of a copolymer useful herein is EVA - the copolymer of a minor amount of vinyl acetate and a major amount of ethylene. Two more examples are copolymers of ethylene and methyl acrylate and copolymers of ethylene and ethyl acrylate.

The grafted block copolymers preferred herein are the reaction products of (1) a grafting monomer; and (2) a block copolymer of polystyrene with an aliphatic middle block. the grafting monomer can be any of those in the previously incorporated patents, and preferably is maleic anhydride. The block copolymer is preferably an "ABA" copolymer in which the end blocks ("A" blocks) are polystyrene and the "B" or middle block is an aliphatic polymer. Examples of middle blocks useful herein are homopolymers or copolymers of butadiene, hydrogenated butadiene, isoprene, and hydrogenated isoprene. Block copolymers contemplated in the present invention contain from about 20% by weight to about 40% by weight polystyrene end blocks and from about 60% to about 80% by weight of the middle block.

The reaction product of (1) and (2) is prepared by blending the reactants in an extruder or other mixer or in solvent dispersion, along with a reaction initiator, such as an organic peroxide. Typically, (2) is by far the dominant ingredient, comprising 97% or more of the product by weight. A commercial example of (2) is the KRATON series of thermoplastic rubbers sold by Shell Chemical Co., Houston, Tex. A commercial example of the graft copolymer is KRATON FG 1901 X maleic anhydride modified thermoplastic rubber, also sold by Shell Chemical Co. The latter material contains 28% by weight polystyrene as the end blocks, 70% of hydrogenated butadiene as the middle block, and 2% bound maleic anhydride. Its Shore A hardness is 75, and its specific gravity is 0.91 g/cc.

The conventional elastomers useful herein are any of those specified in the patents previously incorporated herein by reference. One preferred elastomer is "EPR", a copolymer of ethylene and propylene which is elastomeric and thermoplastic. A useful commercial material of this kind is POLYSAR EPM 306, sold by Polysar Inc., Akron, Ohio. Thermoplastic elastomers are preferred, as are elastomers which are compatible with the other ingredients of the composition.

Nonelastomeric second polyolefins contemplated for use herein are any of the materials described previously as suitable base resins, but have a different predominant monomer than the selected base resin and are present as a substantially smaller proportion of the composition than the base resin. One example of a nonelastomeric second polyolefin contemplated herein is high density polyethylene, used with a polypropylene base resin. A specifically contemplated nonelastomeric second polyolefin is CHEVRON 9634 polyethylene, available from Chevron Chemical Co., San Francisco, Calif.

Other ingredients can be added to the present compositions in amounts which do not destroy their contemplated utility. Three examples are fillers, adhesion promoters, and antioxidants.

The ingredients of the present compositions can be blended in many ways, preferably by tumbling particulate ingredients together thoroughly and passing the composite through an extruder which mixes the ingredients to form a homogeneous composition having consistent proportions. The composition can be provided as pellets or noodles suitable for being processed in a coextrusion line, or directly as an extruded product formed from the ingredients in a one-step process.

The present compositions can be provided or used as primers or tie layers, as formed films or sheets capable of being laminated between formed substrate films or sheets or receiving a freshly extruded film or sheet of either or both substrates, as dispersions in a solvent, as powder coatings or fluid-applied (molten or solvent-based) coatings on aluminum, other metals and other polar and nonpolar substrates, or otherwise. One particular contemplated way of forming a composite structure of the present composition and a substrate is to coextrude the respective materials.

Laminates according to the present invention can comprise two facing layers joined by an intermediate tie layer of the present composition, functioning as an adhesive. Additional layers are also contemplated. For example if polar layers are "A", tie layers are "B", and nonpolar layers are "C", laminates of the present invention can comprise an "ABA", "CBC", or "ABC" three-layered structure. Multilayer laminates containing the "ABC" core structure can include "ABCBA", "CBABC", or "ABCCBA" structures, or even "ABCB" laminates in which an outer layer is made of a composition according to the present invention.

The compositions of the present invention adhere better than previous compositions to a wide variety of nonpolar substrates such as any of the polyolefins previously specified, polydiolefins, polystyrene, copolymers and mixtures thereof, and copolymers thereof with minor amounts of polyvinyl acetate or polyvinyl alcohol, and to a wide variety of polar substrates such as polyamides, polyethers, polyesters, polyvinyl acetate, polyvinyl alcohol, polymethyl acrylate, polyethyl acrylate, polyethyl methacrylate, ethylene vinyl alcohol copolymers (EVOH), polycarbonate, mixtures and copolymers of any of the foregoing, copolymers thereof with minor amounts of polyolefins or polydiolefins, aluminum or other metals in foil or rigid form, wood, paper, etc. Of particular value is the high total adhesion between a polar substrate and a nonpolar substrate provided by a tie layer of the present composition, functioning as an adhesive. This property is measured by laminating a polar substrate, a nonpolar substrate, and an intermediate tie layer and measuring the ability of the composite to withstand delamination. Delamination is likely to occur at the weaker of the two interfaces between the three layers. An adhesive which adheres tightly to each substrate has a higher total adhesion than an adhesive which adheres tightly to one substrate and less tightly to another. Two nonpolar substrates or two polar substrates can also be joined using the present composition, functioning as an adhesive.

EXAMPLES 1-2

Adhesive compositions substantially according to the prior art (Example 1) and according to the present invention (Example 2) were formed by extruding and pelleting the formulas stated in Table 1 in a single-screw extruder. Tie layers of each composition were coextruded with alternating layers of polypropylene and an EVOH copolymer (SOARNOL DC, sold by Nippon Gohsei, Osaka, Japan) on a laboratory cast film line at a melt temperature of 420° F. (216° C.) to provide five-layer films consisting of the following layers in order: polypropylene/tie layer/EVOH/tie layer/poly-propylene. One film was 178 microns (7 mils) thick and the other was 254 microns (10 mils) thick for each tie layer formulation. Each film was then tested for T-peel adhesion on an Instron at a crosshead speed of 10 inches per minute (4.2 mm per second). The peel was started between one of the tie layers and the EVOH layer. The adhesion results were as stated in Table 2.

Examples 1 and 2 illustrate the surprising result that combining the graft copolymer of one resin with a different base resin (polypropylene), instead of combining the graft copolymer of polypropylene with more polypropylene, actually increased the adhesion of the tie layer. According to prior knowledge, a decrease in adhesion would be expected.

EXAMPLES 3-8

Coextruded films including as tie layers the three-component blends having the formulations shown in Tables 3, 5, and 7 were prepared as described in Examples 1 and 2. The adhesion results are shown in Tables 4, 6, and 8.

Examples 3 and 4, Tables 3 and 4, illustrate that the adhesion of a three-component blend of polypropylene, and elastomer, and grafted polypropylene was improved substantially by substituting the grafted polystyrene block copolymer of Example 4 for the grafted polypropylene of Example 3.

Examples 5 and 6 employ adhesive compositions within the scope of the present invention. These examples illustrate that in the preferred embodiment, the replacement of some of the polypropylene base material with polyethylene surprisingly and substantially improved adhesion.

Examples 7 and 8, Tables 7 and 8, illustrate that the invention works with a polyethylene base resin, and that adhesion can be substantially improved if a conventional grafted EPR elastomer is replaced with a grafted polystyrene block copolymer according to the present invention.

TABLE 1

| Ingredient | Comparative Example 1 % by weight | Example 2 % by weight |
| --- | --- | --- |
| Polypropylene[1] | 75% | 75% |
| grafted polypropylene[2] | 25% | — |
| grafted polystyrene block copolymer[3] | — | 25% |
| Total | 100% | 100% |

[1]ESCORENE 4092 sold by Exxon Chemicals, Houston, Texas.
[2]HERCOPRIME A, sold by Himont USA, Wilmington, Delaware.
[3]KRATON FG 1901X, sold by Shell Chemical Company, Houston, Texas.

TABLE 2

| Example | Film Thickness | Adhesion to EVOH |
| --- | --- | --- |
| 1 (comparative) | 7 mil (0.18 mm) | 0.6 lb/in (107 g/cm) |
| 2 | 7 mil (0.18 mm) | 1.6 lb/in (286 g/cm) |
| 1 (comparative) | 10 mil (0.25 mm) | 1.5 lb/in (268 g/cm) |
| 2 | 10 mil (0.25 mm) | 3.6 lb/in (642 g/cm) |

TABLE 3

| Ingredient | Comparative Example 3 % by weight | Example 4 % by weight |
| --- | --- | --- |
| polypropylene[1] | 65% | 65% |
| EPR elastomer[2] | 20% | 20% |
| grafted polypropylene[3] | 15% | — |
| grafted polystyrene block copolymer[4] | — | 15% |
| Total | 100% | 100% |

[1]ESCORENE 4092, sold by Exxon Chemicals, Houston, Texas.
[2]POLYSAR EPM 306, sold by Polysar Incorporated, Akron, Ohio.
[3]HERCOPRIME A, sold by Himont USA, Houston, Texas.
[4]KRATON FG 1901 X, sold by Shell Chemical Co., Houston, Texas.

TABLE 4

| Example | Film Thickness | Adhesion to EVOH |
| --- | --- | --- |
| 3 (comparative) | 7 mil (0.18 mm) | 0.3 lb/in (53 g/cm) |
| 4 | 7 mil (0.18 mm) | 0.8 lb/in (143 g/cm) |
| 3 (comparative) | 10 mil (0.25 mm) | 1.2 lb/in (214 g/cm) |
| 4 | 10 mil (0.25 mm) | 3.3 lb/in (589 g/cm) |

TABLE 5

| Ingredient | Example 5 % by weight | Example 6 % by weight |
| --- | --- | --- |
| polypropylene[1] | 65% | 50% |
| EPR elastomer[1] | 20% | 20% |
| grafted block copolymer[1] | 15% | 15% |
| high-density polyethylene[2] | — | 15% |
| Total | 100% | 100% |

[1]Same as in Table 3.
[2]CHEVRON 9634, sold by Chevron Chemical Co., San Francisco, California

TABLE 6

| Example | Film Thickness | Adhesion to EVOH |
| --- | --- | --- |
| 5 | 8 mil (0.20 mm) | 1.5 lb/in (268 g/cm) |
| 6 | 8 mil (0.20 mm) | 2.9 lb/in (517 g/cm) |
| 5 | 10 mil (0.25 mm) | 3.3 lb/in (589 g/cm) |
| 6 | 10 mil (0.25 mm) | 5.5 lb/in (981 g/cm) |

TABLE 7

| Ingredient | Comparative Example 7 % by weight | Example 8 % by weight |
| --- | --- | --- |
| polyethylene copolymer (EVA)[1] | 94% | 94% |
| grafted EPR elastomer[2] | 6% | — |
| grafted polystyrene block copolymer[3] | — | 6% |
| Total | 100% | 100% |

[1]ESCORENE 324.55, sold by Exxon Chemicals, Houston, Texas.
[2]XX1601, sold by Exxon Chemicals, Houston, Texas.
[3]KRATON FG 1901X, sold by Shell Chemical Company, Houston, Texas.

TABLE 8

| Example | Film Thickness | Adhesion to EVOH |
| --- | --- | --- |
| 1 (comparative) | 3 mil (0.08 mm) | 0.4 lb/in (71 g/cm) |
| 2 | 3 mil (0.08 mm) | 1.4 lb/in (250 g/cm) |
| 1 (comparative) | 5 mil (0.13 mm) | 1.3 lb/in (232 g/cm) |
| 2 | 5 mil (0.13 mm) | 3.2 lb/in (572 g/cm) |

We claim:

1. An adhesive composition consisting of a mixture of:

A. from about 30% to about 99.9% by weight of a polyolefin base resin selected from the group consisting of polypropylene; polyethylene; and compolymers of ethylene with vinyl acetate, vinyl alcohol, methyl acrylate, methylmethacrylate, ethyl acrylate, and ethyl methacrylate;

B. from about 0.1% to about 50% by weight of a graft polymerized block copolymer having polystyrene end blocks and at least one polymer of an olefin, diolefin, or mixture thereof or a hydrogenated polymer thereof as a middle block, graft polymerized by treatment with at least one monomer selected from carboxylic acids, their anhydrides, and mixtures thereof;

C. from 0 to about 30% by weight of a nonelastomeric second polyolefin made from different monomers from those of said polyolefin base resin; and optional fillers, adhesion promoters and antioxidants.

2. The composition of claim 1, wherein said base resin consists essentially of polypropylene.

3. The composition of claim 1, containing from about 70% to about 98% by weight of said base resin.

4. The composition of claim 1, wherein the middle block of said graft polymerized block copolymer consists essentially of hydrogenated polybutadiene.

5. The composition of claim 1, wherein said graft-polymerized block copolymer is an ABA block copolymer having about 28% by weight polystyrene end blocks and 70% by weight of a middle block consisting essentially of hydrogenated polybutadiene, grafted with about 2% by weight maleic anhydride.

6. The composition of claim 1, wherein said monomer is maleic anhydride.

7. The composition of claim 1, containing from about 2% to about 30% by weight of said graft-polymerized block copolymer.

8. The composition of claim 1, containing from about 70% to about 98% by weight said base resin.

9. The composition of claim 1, wherein said base resin consists essentially of polypropylene and said nonelastomeric second polyolefin consists essentially of polyethylene.

10. The composition of claim 1, containing from about 10% to about 20% by weight of said nonelastomeric second polyolefin.

11. The composition of claim 1, wherein said base resin consists essentially of a copolymer of ethylene and vinyl acetate.

12. The composition of claim 1, wherein said base resin consists essentially of a copolymer of ethylene and methyl acrylate.

13. The composition of claim 1, wherein said base resin consists essentially of a copolymer of ethylene and ethyl acrylate.

14. The composition of claim 10, wherein said base resin consists essentially of polypropylene and said nonelastomeric second polyolefin consists essentially of polyethylene.

* * * * *